(12) United States Patent
Jaskiewicz et al.

(10) Patent No.: US 11,148,687 B2
(45) Date of Patent: Oct. 19, 2021

(54) HIGH VOLTAGE INTERCONNECTION SYSTEM

(71) Applicant: Tyco Electronics UK Ltd., Swindon (GB)

(72) Inventors: Piotr Jaskiewicz, Bristol (GB); Robert Phillpotts, Swindon (GB)

(73) Assignee: Tyco Electronics UK Ltd., Swindon (GB)

( * ) Notice: Subject to any disclaimer, the term of this patent is extended or adjusted under 35 U.S.C. 154(b) by 0 days.

(21) Appl. No.: 16/847,040

(22) Filed: Apr. 13, 2020

(65) Prior Publication Data

US 2020/0239045 A1 Jul. 30, 2020

Related U.S. Application Data

(63) Continuation of application No. PCT/EP2018/077409, filed on Oct. 9, 2018.

(30) Foreign Application Priority Data

Oct. 13, 2017 (EP) .................................. 17196391

(51) Int. Cl.
*H01R 11/00* (2006.01)
*B61G 5/10* (2006.01)
*H01R 24/28* (2011.01)

(52) U.S. Cl.
CPC ............... *B61G 5/10* (2013.01); *H01R 24/28* (2013.01)

(58) Field of Classification Search
CPC ....... H01R 11/00; H01R 25/003; H01R 31/06

USPC ........................................... 439/502, 505, 34
See application file for complete search history.

(56) References Cited

U.S. PATENT DOCUMENTS

| 762,684 A * | 6/1904 | Case |
| 4,017,136 A * | 4/1977 | Sasgen .................... B61G 5/10 439/503 |
| 5,216,285 A | 6/1993 | Hilsenteger |
| 7,014,493 B1 * | 3/2006 | Battard .............. H01R 13/6395 439/371 |
| 8,172,335 B2 * | 5/2012 | Burns .................... E21B 47/06 299/2 |

FOREIGN PATENT DOCUMENTS

| CN | 104608776 A | 5/2015 |
| EP | 2665147 A1 | 11/2013 |

(Continued)

OTHER PUBLICATIONS

Extended European Search Report, Application No. 17196391.1, dated Apr. 5, 2018, 8 pages.

(Continued)

*Primary Examiner* — Phuong K Dinh
(74) *Attorney, Agent, or Firm* — Barley Snyder

(57) ABSTRACT

A high voltage interconnection system for electrically interconnecting a pair of objects that are movable relative to each other includes a flexible cable, a connection arrangement electrically contacting an end of the flexible cable, and a cable holder arrangement holding the flexible cable in a slidable manner. The cable holder arrangement may include a wear plate fixed to at least one of the objects and a sliding collar fixed on the flexible cable. The collar may be slidably supported to protect the flexible cable from damage as it moves.

18 Claims, 9 Drawing Sheets

(56) References Cited

FOREIGN PATENT DOCUMENTS

| JP | H0651045 A | 7/1994 |
|---|---|---|
| JP | 08169334 A | 7/1996 |
| WO | 20160119509 A1 | 8/2016 |
| WO | 2016150852 A1 | 9/2016 |

OTHER PUBLICATIONS

Notification of Transmittal of The International Search Report and The Written Opinion of the International Searching Authority, International Application No. PCT/EP2018/-77409, dated Feb. 12, 2019, 14 pages.
English translation of JPH0651045U, dated Jul. 12, 1994, 11 pages.
Abstract of EP3237240, related to WO2016150852, dated Nov. 1, 2017, 1 page.
Abstract of WO2016119509, dated Aug. 4, 2016, 2 pages.
Abstract of JPH08169334(A), dated Jul. 2, 1996, 1 page.
First Office Action in Japanese Appln. No. 2020-520122, dated Jun. 1, 2021, and English translation thereof, 18 pages.
Korean Office Action and English translation, dated Aug. 2, 2021, 12 pages.

\* cited by examiner

HIGH VOLTAGE INTERCONNECTION SYSTEM

CROSS-REFERENCE TO RELATED APPLICATIONS

This application is a continuation of PCT International Application No. PCT/EP2018/077409, filed on Oct. 9, 2018, which claims priority under 35 U.S.C. § 119 to European Patent Application No. 17196391.1, filed on Oct. 13, 2017.

FIELD OF THE INVENTION

The present invention relates to an interconnection system and, more particularly, to a high-voltage interconnection system for electrically interconnecting two objects that are movable relative to each other.

BACKGROUND

Systems for electrically interconnecting two objects that are movable relative to each other, such as coupled train cars, are known in the art. Such systems are, just by way of example, arranged on a roof of a train or under a bottom of a train and electrically interconnect electrical systems of a train such as electric power systems or electronic components.

Known high voltage connection systems use large high voltage outdoor post insulators or else rigid high voltage terminations on the train cars on which cables are mounted that interconnect the train cars. Such systems may have several drawbacks. Firstly, the systems usually occupy large amounts of space. The post insulators/terminations need to be large enough to separate conductors from components of the train. Further, such systems are often not protected against accidental contact. Finally, in particular the systems comprising post insulators/terminations have a complicated structure for providing the required movability which is needed to provide an electrical connection even when the two objects, in particular the train cars, move with respect to each other.

SUMMARY

A high voltage interconnection system for electrically interconnecting a pair of objects that are movable relative to each other includes a flexible cable, a connection arrangement electrically contacting an end of the flexible cable, and a cable holder arrangement holding the flexible cable in a slidable manner.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
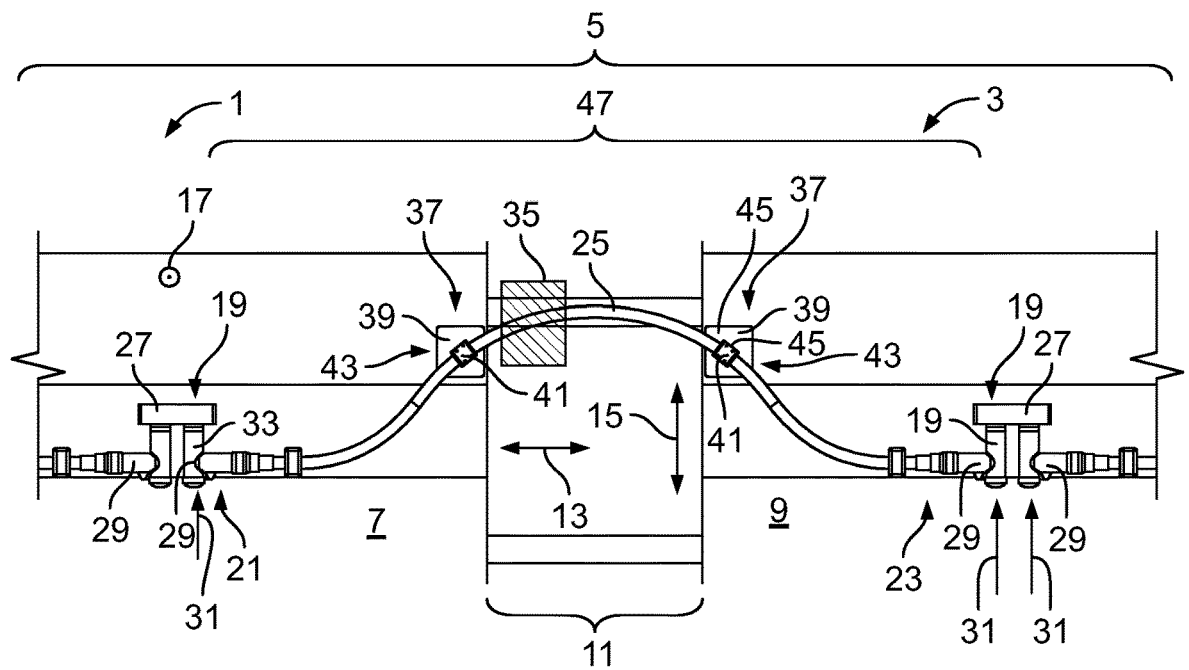
FIG. 1 is a top view of a high voltage interconnection system used in an assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

An assembly 5 according to an embodiment with a high voltage interconnection system is shown in FIG. 1. FIG. 1 shows a pair of train cars 1 and 3 which are arranged adjacent to each other and which are coupled with each other. The train cars 1 and 3 are part of the assembly 5. The train cars 1 and 3 may in particular be part of a train. It should be noted that the term "train cars" may refer to a passenger car, a freight car, a locomotive or other cars that can be coupled with each other. Of course, it may also refer to a truck and a trailer which together form a type of train.

FIG. 1 shows a top view onto a roof 7 and 9 of each of the train cars 1 and 3. A region 11 is formed between the train cars 1 and 3 in which at least parts of the train cars 1 and 3 are spaced apart from each other. The train cars 1 and 3 are coupled with each other along a longitudinal direction 13 which generally is identical to a drive direction of a train and which is consequently parallel with the direction of tracks on which the train moves. A lateral direction 15 extends perpendicular to the longitudinal direction 13. Both the longitudinal direction 13 and the lateral direction 15 are parallel with a horizontal plane 35 which is only indicated by the hachure in FIG. 1. A vertical direction 17 is arranged perpendicular to the longitudinal direction 13 and the lateral direction 15 and is therefore parallel with the viewing axis as used in FIG. 1.

Each train car 1 and 3, as shown in FIG. 1, has a connection arrangement 19. Each connection arrangement 19 is connected to one of a pair of ends 21 and 23 of a flexible cable 25. The connection arrangements 19 are electrically interconnected via the flexible cable 25, which particularly connects high voltage systems of the train cars 1 and 3. Each connection arrangement 19 has a connection element 27 and at least one counter-connection element 29. The counter-connection elements 29 may in particular be screened separable connectors. The connection elements 27 are fixated on the roofs 7 and 9 of the train cars 1 and 3, whereas the counter-connection elements 29 are fixated to and electrically contacted to the corresponding ends 21 and 23 of the flexible cable 25. In other embodiments, the connection arrangements 19 may, for example, be arranged under the roofs of the train cars 1 and 3 or under the bottoms of the train cars 1 and 3.

The connection elements 27, as shown in FIG. 1, have bushings which are formed complementary to the counter-connection elements 29 such that the connection elements 27 and the counter-connection elements 29 can be connected with each other in a pluggable manner. The connection element 27 and the counter-connection element 29 may be complementary plug connectors. The bushing will be described later on with respect to FIGS. 11-16. The connection elements 27 of the embodiment shown in FIG. 1 provide a U-shape such that two counter-connection elements 29 can be connected to one connection element 27. Plug directions 31 of the bushings extend parallel with the lateral direction 15 in the first embodiment. The counter-connection elements 29 are formed as T-shaped connectors, whose ends 33 are formed complementary to the bushings of the connection elements 27.

The flexible cable 25, the connection elements 27, and the counter-connection elements 29 are insulated to the outside, and have an outer conductive layer that is connected to ground potential, such that an unintentional contact with any of these elements does not necessarily lead to a contact with any high voltage conductive parts. In order to secure the position of the counter-connection elements 29 with a connection element 27, the counter-connection elements 29 may be secured with screws or bolts that can be engaged with internal threads in the bushings.

The flexible cable 25 extends along a curved path from the connection arrangement 19 of the train car 1 to the connection arrangement 19 of the other train car 3, as shown in FIG. 1. The curved path of the flexible cable 25 basically extends along the horizontal plane 35 which is perpendicular to the longitudinal direction 13 and the lateral direction 15. The curved path allows the flexible cable 25 to react to movements of the train cars 1 and 3 relative to each other. Upon movement of the train cars 1 and 3, for example when the assembly 5 is moved along curved tracks, the flexible cable 25 is either compressed or uncompressed along the longitudinal direction 13. Due to the curved path, the flexible cable 25 will then react by moving along the lateral direction 15. The basically horizontal arrangement may allow slight deviations due to the gravitational force. For example, sagging of the at least one flexible cable 25 of about one to three times the outer diameter of the flexible cable 25 may be allowed.

In order to allow a movement of the flexible cable 25 at least along the lateral direction 15 and the longitudinal direction 13, the assembly 5 has a pair of cable holder arrangements 37, as shown in FIG. 1. Each cable holder arrangement 37 has a wear-plate 39 which is fixated to the corresponding train car 1 or 3, in particular to the roof 7 or 9, and a sliding collar 41 which is fixated to the flexible cable 25 in the region of the wear-plate 39. The flexible cable 25 is movable in the cable holder arrangements 37 at least partially parallel with the horizontal plane 35, whereas a movement in the vertical direction 17 is prevented. Thereby, the flexible cable 25 can be held in a slidable manner. In an embodiment, the at least one sliding collar 41 may have an overall shape of a bushing or a ring which extends around the flexible cable 25.

The sliding collars 41 reduce friction between the flexible cable 25 and the wear-plates 39 and, at the same time, protect the flexible cable 25 from damages due to frictional forces. As shown in FIG. 1, each of the sliding collars 41 has a guiding opening 43 which extends along the longitudinal direction 13 through the sliding collar 41 and which opens up a space along the longitudinal direction 13 and the lateral direction 15. The sliding collar 41 and/or the wear-plate 39, and in an embodiment both, are made from a hard plastic material 45, for example a thermoplastic material.

In order to predefine the curved path of the flexible cable 25, the cable holder arrangement 37 and the corresponding connection arrangement 19 of each train car 1 and 3 are offset with respect to each other along the lateral direction 15, as shown in FIG. 1.

The connection arrangement 19 allows the at least one flexible cable 25 to be easily connected to the train, in particular to an electrical system of the train. The at least one cable holder arrangement 37 is capable of holding the at least one flexible cable 25 in a slidable manner and therefore allows the cable 25 to move at least within certain limits. This movability is beneficial for counterbalancing deformations of the flexible cable 25 during movements of the objects relatively to each other.

The at least one flexible cable 25, in an embodiment, has a central flexible conductor to carry the high voltage with an insulating layer surrounding the flexible conductor in a circumferential direction, also an electrically conductive screen layer over the insulation that is connected to ground potential, and finally with an outer protective insulating jacket. This method of insulation allowing the high voltage cable 25 to make intimate contact with the car body and other grounded objects without electrical discharges occurring. The at least one connection arrangement 19 is also provided with insulating device that includes a grounded electrical screen covering such that the high voltage connection arrangement 19 can make intimate contact with the car body and other grounded objects without electrical discharges occurring, at least when the at least one counter-connection element 29 is connected to the at least one connection element 27.

The flexible cable 25, the connection arrangements 19 and the cable holder arrangements 37 together form a high voltage interconnection system 47 shown in FIG. 1. The high voltage interconnection system 47 forms a versatile system which can be easily adapted for different requirements which may depend on the objects, in particular on the train cars to which the system is to be installed. By using at least one connection arrangement 19, post insulators or rigid high voltage cable terminations may be omitted such that the safety and the compactness of the system are improved.

In the following, further embodiments of the assembly 5 and/or the high voltage interconnection system 47 according to the invention are described, wherein like reference numbers refer to like elements. Thereby, only the differences to the aforementioned embodiment are described in detail for the sake of brevity.

Figure 2:
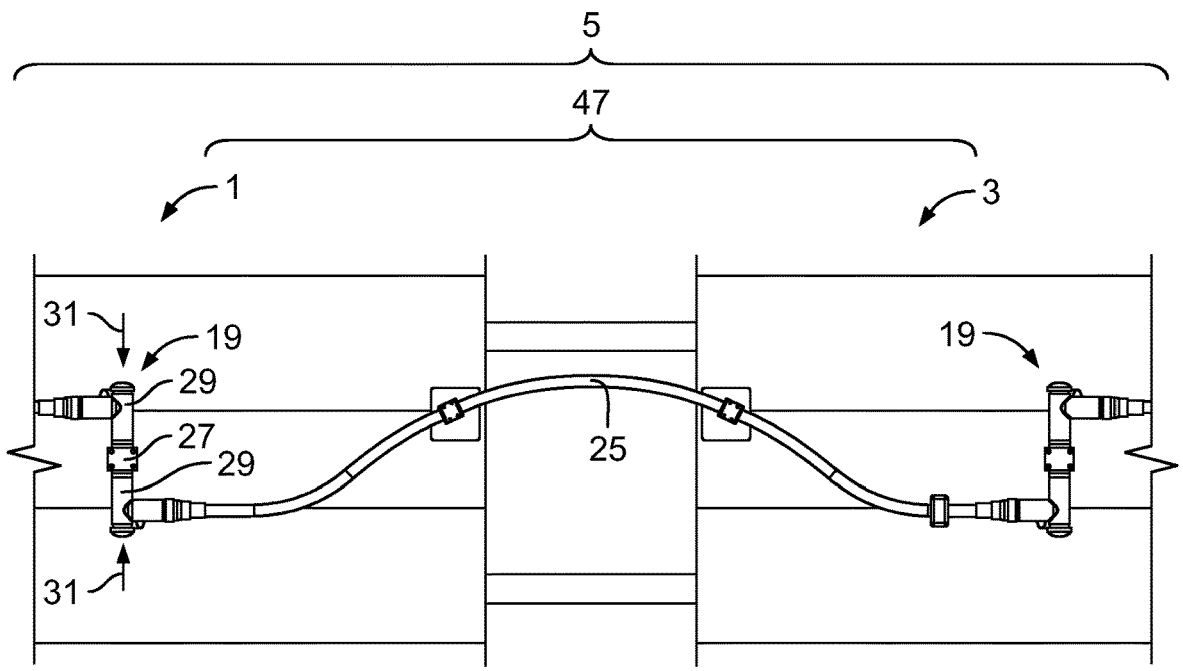
FIG. 2 is a top view of a high voltage interconnection system used in an assembly according to another embodiment.

In FIG. 2, another embodiment of an assembly 5 with a high voltage interconnection system 47 is shown. The second embodiment differs from the first mentioned embodiment in that the connection arrangements 19 are not provided with U-shaped bushings but with an inline arrangement. Consequently, each connection arrangement 19 which is adapted for connecting two counter-connection elements 27 is provided with bushings that are arranged parallel with each other but with opposite plug directions 31. Also this embodiment allows a horizontal arrangement, at least of the connection arrangements 19.

Figure 3:
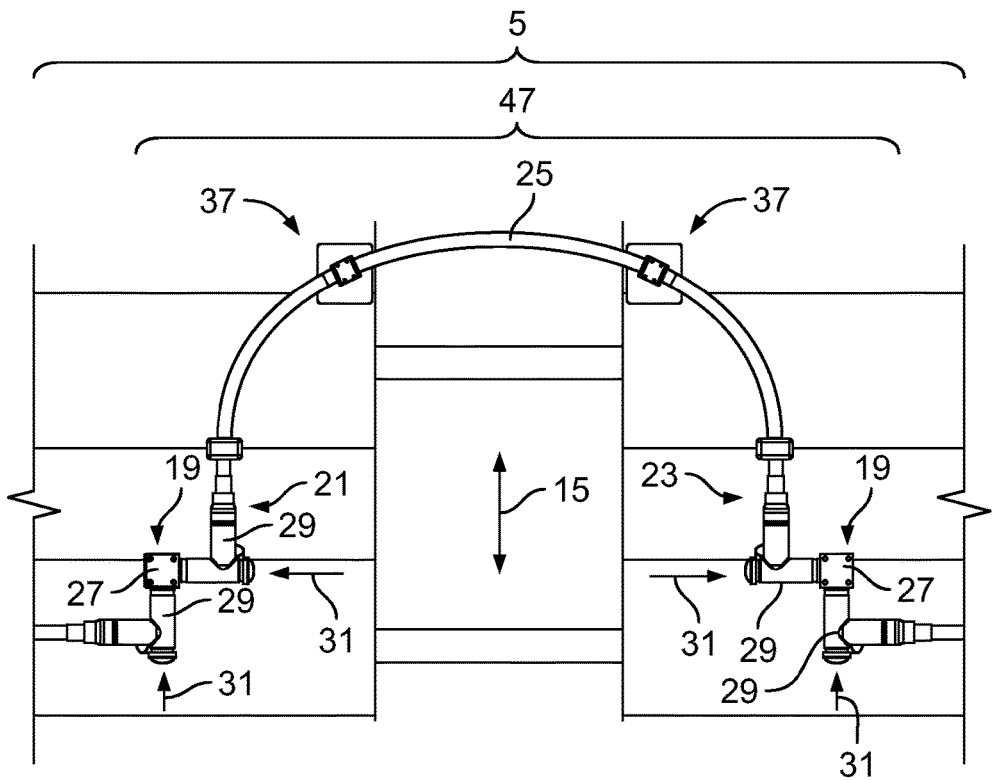
FIG. 3 is a top view of a high voltage interconnection system used in an assembly according to another embodiment.

In FIG. 3, a high voltage interconnection system 47 and an assembly 5 are shown in which the connection arrangements 19 are adapted for forming 90° connections. Consequently, the plug directions 31 of one connection arrangement 19 are perpendicular to each other since the bushings of the connection elements 27 are arranged with a 90° angle relative to each other. The curved path of the flexible cable 25 in the third embodiment basically resembles the shape of a U. Thereby, the flexible cable 25 is, at least at its ends 21 and 23, arranged parallel with the lateral direction 15. In another embodiment, the flexible cable 25 can form an S-shape.

Figure 4:
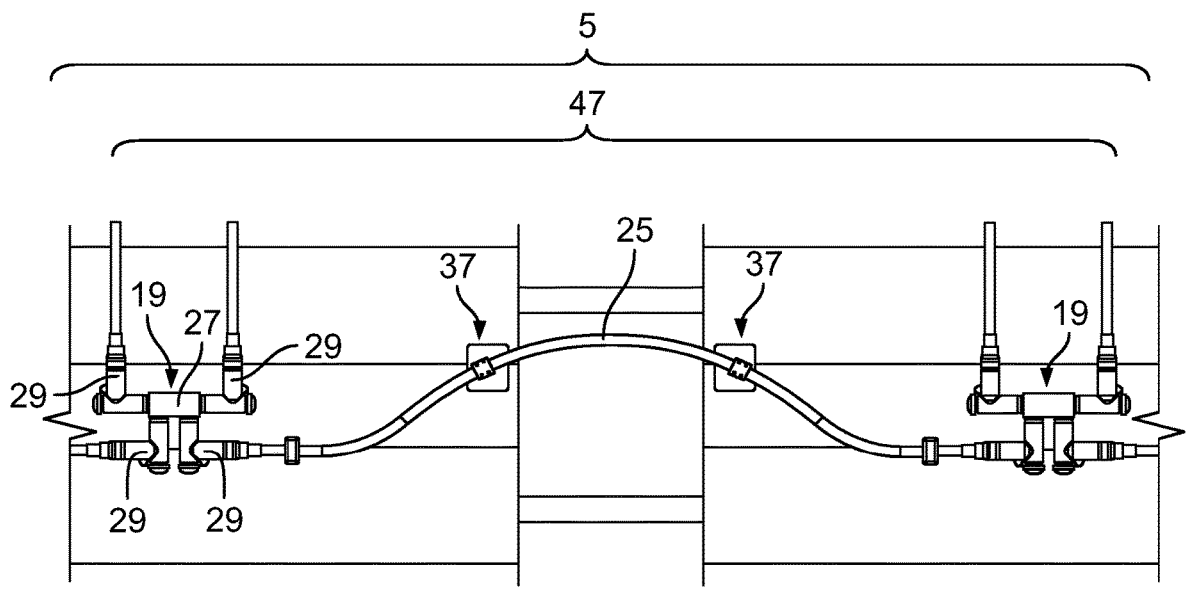
FIG. 4 is a top view of a high voltage interconnection system used in an assembly according to another embodiment.

The fourth embodiment shown in FIG. 4 differs from the first embodiment shown in FIG. 1 in that the connection arrangements 19 provide 4-way connectors. The connection arrangements 19 have connection elements 27 which are each provided with four bushings for connecting four counter-connection elements 29. Thereby, two counter-connection elements 29 can be arranged adjacent to each other as in the first embodiment and two additional counter-connection elements 29 can be arranged opposite to each other as in the second embodiment. Or, in other words, each connection arrangement 19 resembles the shape of two 90° arrangements of the third embodiment which are connected with each other to form a 4-way connector.

Figure 5:
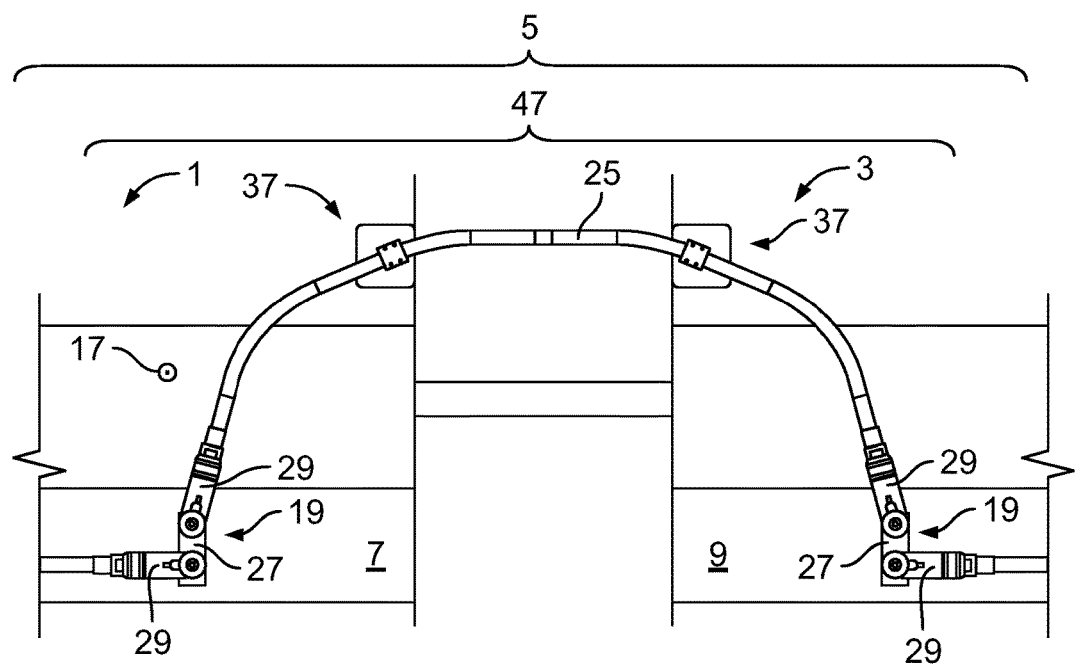
FIG. 5 is a top view of a high voltage interconnection system used in an assembly according to another embodiment.

A fifth embodiment of a high voltage interconnection system 47 and of an assembly 5 is shown in FIG. 5. For the fifth embodiment, similar components are used as for the first embodiment as described with respect to FIG. 1 except for the connection arrangements 19 being provided with connection elements 27 that can be fixated on the roof 7 and 9 of the train cars 1 and 3 not in a horizontal, but in a vertical manner such that the plug directions 31 (not shown) are parallel with the vertical direction 17. The connection elements 27 are provided with U-shapes wherein the legs of the U extend parallel with the vertical direction 17 away from the corresponding roof 7 or 9 of the train cars 1 or 3.

Figure 6:
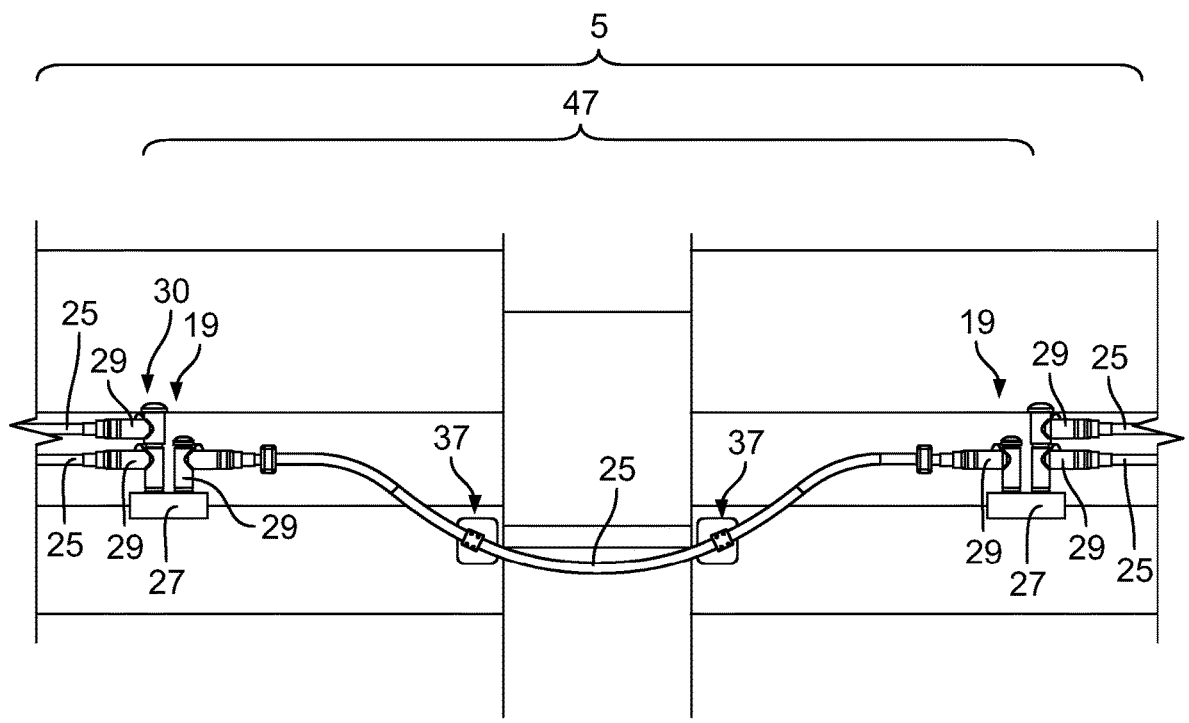
FIG. 6 is a top view of a high voltage interconnection system used in an assembly according to another embodiment.

In order to interconnect more than two cables 25 with a single connection arrangement 19 that is provided with U-shaped bushings as, for example, used in the embodiment as described with respect to FIG. 1, the counter connection elements 29 may be formed in an interconnectable manner. Such an embodiment is shown in FIG. 6. The connection elements 27 may be similar to the one as used in the first embodiment described with respect to FIG. 1. However, the counter connection elements 29 may differ from the aforementioned embodiments in that two counter connection elements 29 can be coupled to form a connection assembly 30. In particular, these counter-connection elements 29 may be screened separable coupling connectors.

Such a connection assembly 30 formed by two counter connection elements 29 can be connected to a single bushing of the connection element 27. In the embodiment of FIG. 6, each of the connection arrangements 19 is provided with one connection assembly 30 such that each connection arrangement 19 is used for interconnecting three cables 25 with each other. It is, however, also possible to provide each connection arrangement 19 with two connection assemblies 30 such that four cables 25 can be interconnected electrically interconnected with each other. It should be noted that a connection assembly 30 as described above can be combined with all embodiments of the assembly 5 and the system 47.

Figure 7:
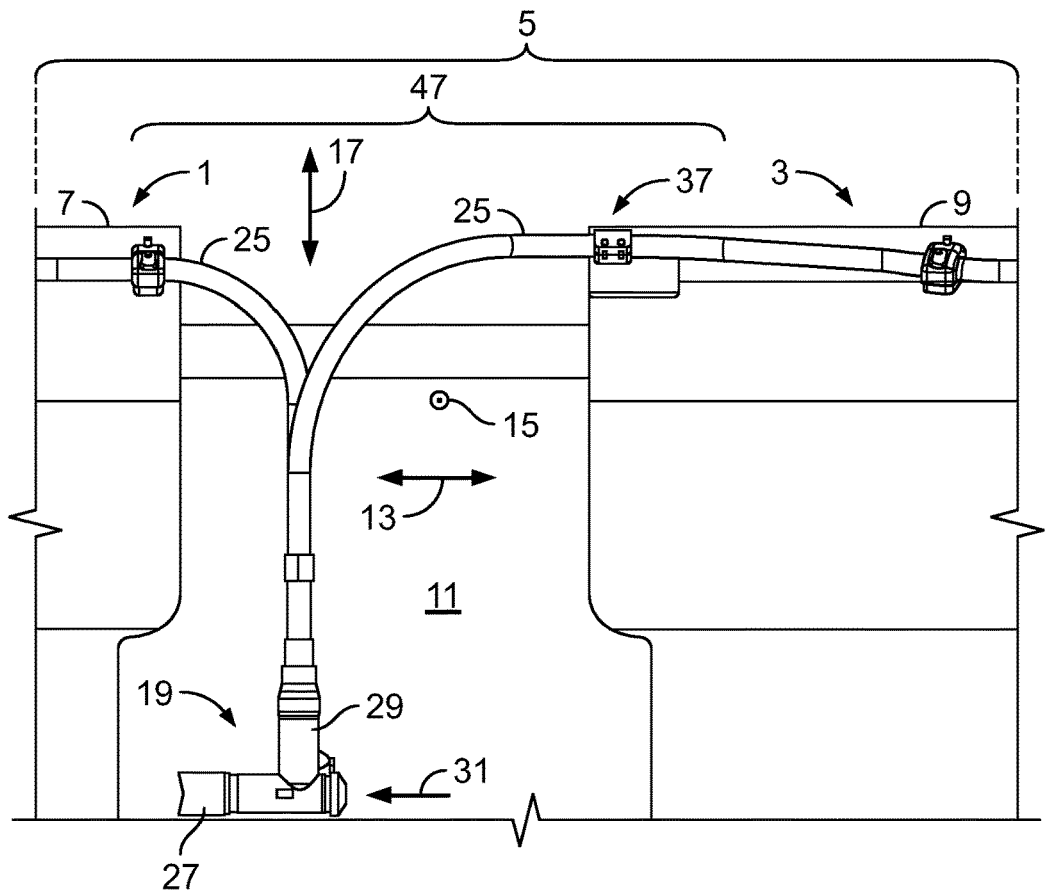
FIG. 7 is a side view of a high voltage interconnection system used in an assembly according to another embodiment.

In FIG. 7, another embodiment of an assembly 5 with a high voltage interconnection system 47 according to the invention is shown. For better visibility, FIG. 7 shows a side view parallel with the lateral direction 15. Here, the high voltage interconnection system 47 comprises one connection arrangement 19 which is arranged between the two train cars 1 and 3 or, in other words, in the region 11. The connection element 27 of the connection arrangement 19 is fixated to the train car 1 such that the bushings of the connection arrangement 19 extend parallel with the longitudinal direction 13.

The connection element 27 can be connected to two counter-connection elements 29. Thereby, one counter-connection element 29 is connected with a flexible cable 25 that extends vertically from the connection arrangement 19 and onto the roof 7 of the train car 1. A second counter-connection element 29 is connected to a flexible cable 25 which extends vertically away from the connection arrangement 19 and then onto the roof 9 of the opposite train car 3. The flexible cable 25 extends through a cable holder arrangement 37 on the roof 9 of the train car 3.

Figure 8:
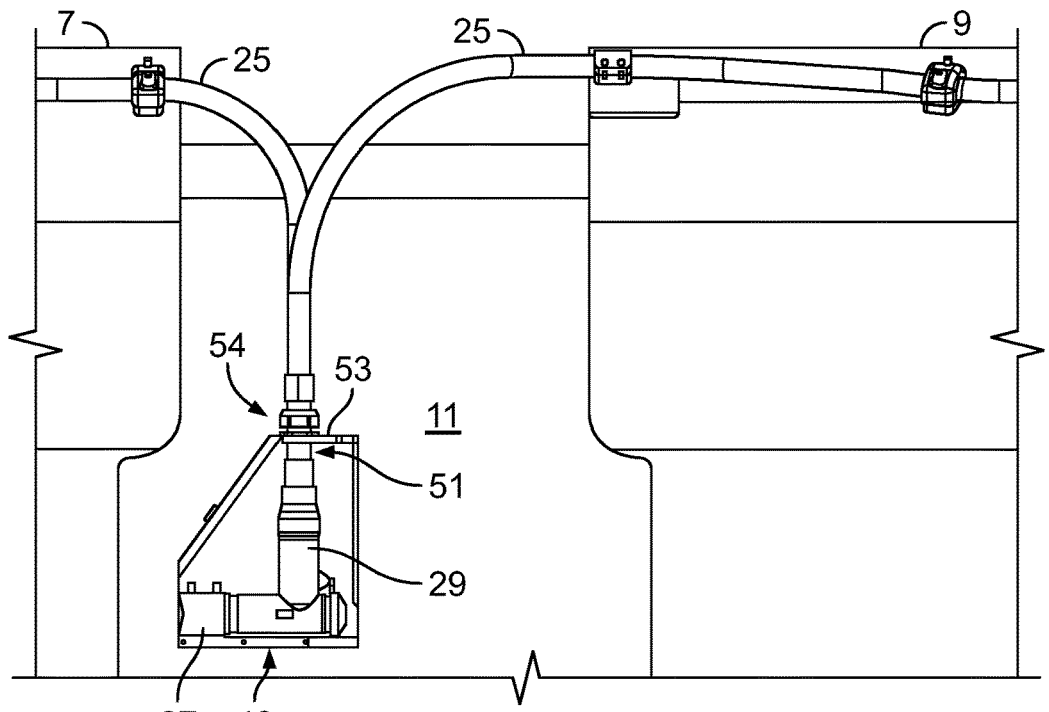
FIG. 8 is a side view of a high voltage interconnection system used in an assembly according to another embodiment.

In FIG. 8, an eighth embodiment of an assembly 5 with a high voltage interconnection system 47 is shown. The eighth embodiment differs from the aforementioned seventh embodiment in that the connection arrangement 19 is housed in a protection cover 49. The protection cover 49, in the shown embodiment, houses the connection element 27 and the counter-connection elements 29 when the same are connected to the connection element 27.

The protection cover 49, as shown in FIG. 8, may have a plurality of through holes 51 for feeding the flexible cable 25 through a wall 53 of the protection cover 49. In order to prevent debris or water from entering the protection cover 49 through the through holes 51, the protection cover 49 has a sealing arrangement 54 which may surround the flexible cables 25 and which closes gaps between the flexible cables 25 and the wall 53 in the region of the through holes 51.

Figure 9:
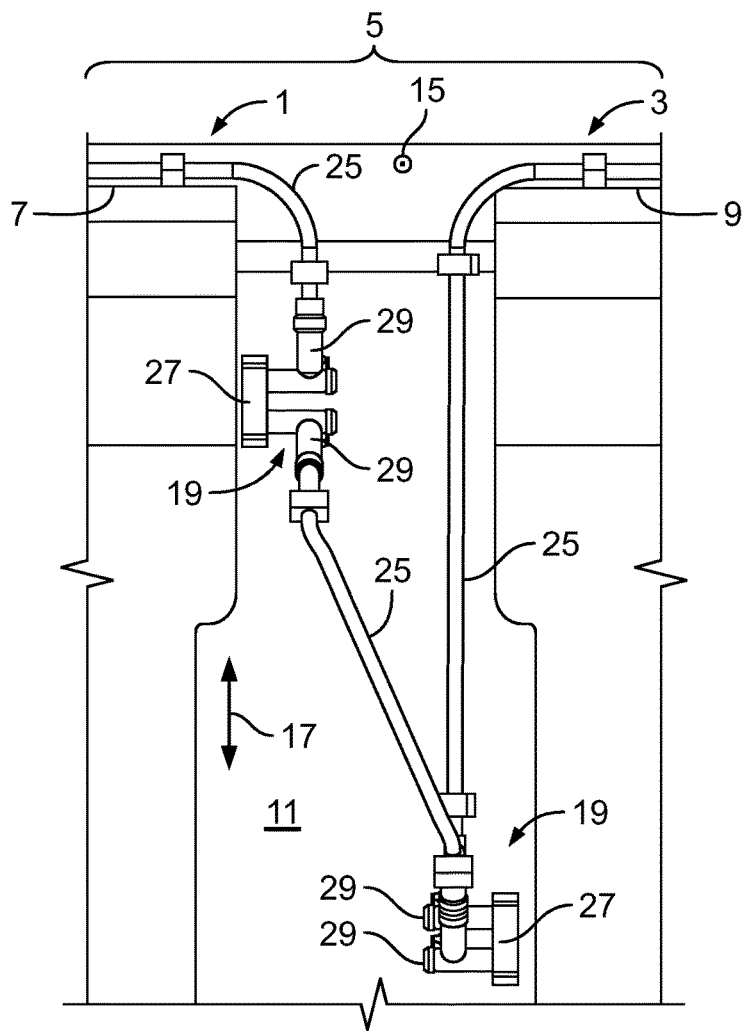
FIG. 9 is a side view of an assembly according to another embodiment.

A further embodiment of an assembly 5 according to the invention is shown in FIG. 9 wherein, as in FIGS. 7 and 8, the viewing axis is parallel with the lateral direction 15. The embodiment as shown in FIG. 9 differs from the embodiments as described with respect to FIGS. 7 and 8 in that two connection arrangements 19 are arranged in the region 11 between the two train cars 1 and 3. Thereby, one connection arrangement 19 is arranged on each of the train cars 1 and 3. Both connection arrangements 19 are fixated with their connection element 27 on one of the train cars 1 and 3, thereby being arranged opposite to each other and offset along the vertical direction 17 with respect to each other. Each connection arrangement 19 has a pair of bushings for connecting two counter-connection elements 29. Thereby, each connection arrangement 19 has a counter-connection element 29 that is connected to a flexible cable 25 that extends from its connection arrangement 19 on the roof 7 or 9 of the corresponding train car 1 or 3.

In order to establish an electrical connection along a train or, in other words, in order to electrically interconnect the two train cars 1 and 3, the two connection arrangements 19 are interconnected via a flexible cable 25 which is provided with a counter-connection element 29 on each end, as shown in FIG. 9. When the two train cars 1 and 3 move with respect to each other, only the flexible cable 25 which interconnects both connection arrangements 19 is deformed. Consequently, the other two flexible cables 25 which extend directly up to the roofs 7 and 9 of the corresponding train cars 1 and 3 will not be deformed. Therefore, cable holder arrangements 37 may be omitted.

Figure 10:
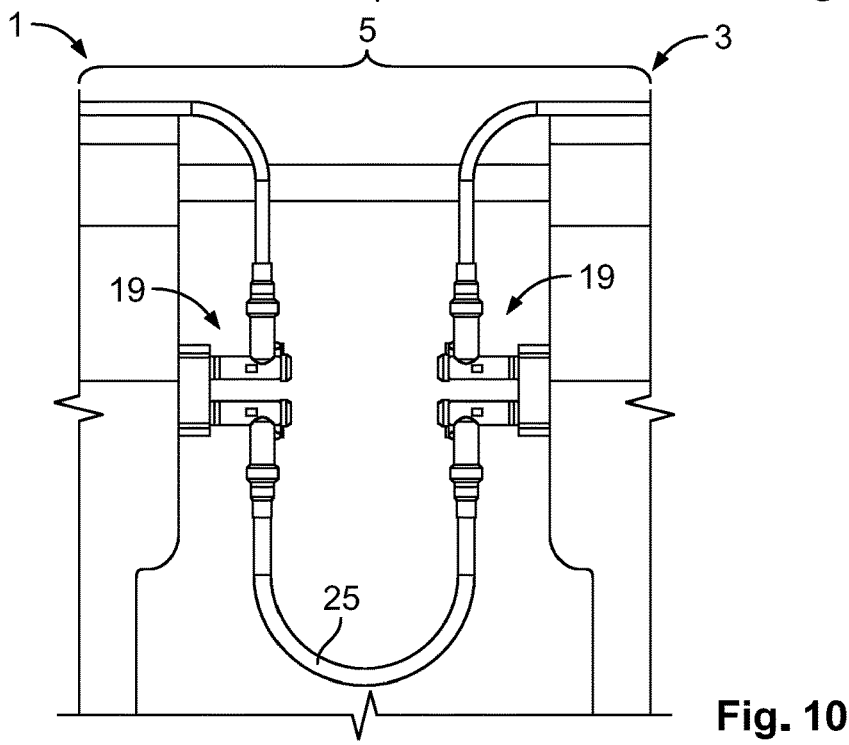
FIG. 10 is a side view of an assembly according to another embodiment.

A further embodiment of an assembly 5 according to the invention is shown in FIG. 10. This embodiment differs from the embodiment as described with respect to FIG. 9 in that the two connection arrangements 19 are arranged opposite to each other along the longitudinal direction 13 such that a flexible cable 25 which interconnects both connection arrangements 19 extends along a U-shape between both train cars 1 and 3.

In the following, connection elements 27 which are used in the embodiments described above with respect to FIGS. 1-10 are described in greater detail with respect to FIGS. 11-16.

Figure 11:
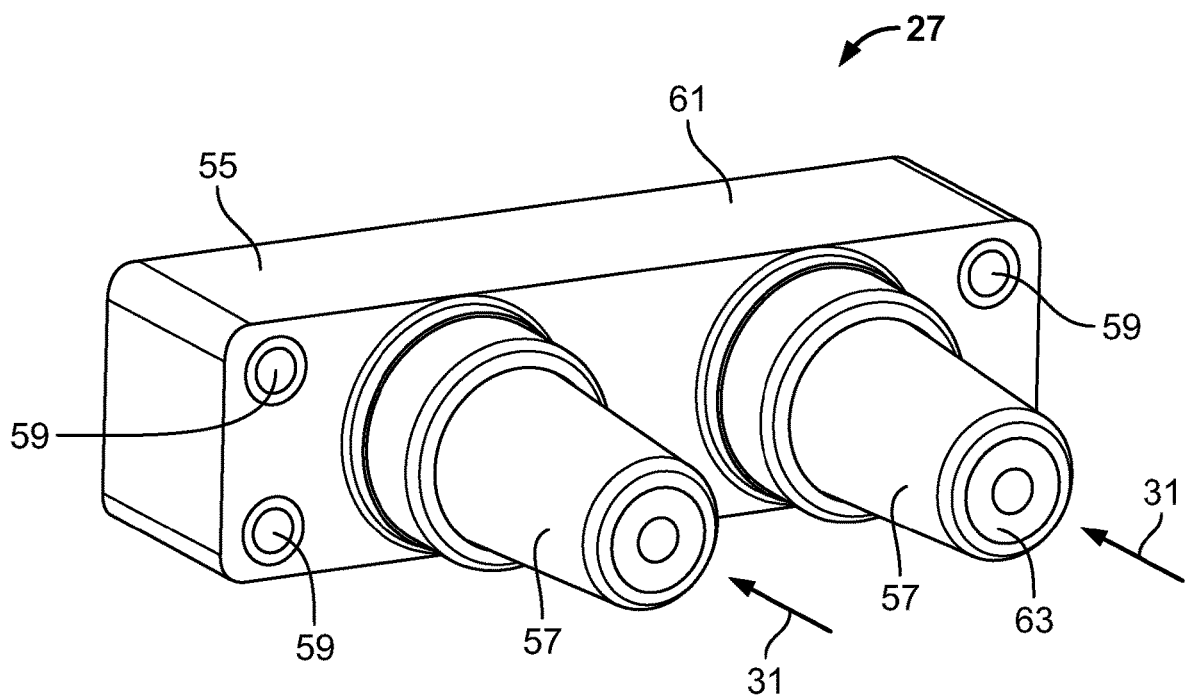
FIG. 11 is a perspective view of a connection element according to an embodiment.

In FIG. 11, a connection element 27 is shown which may be used in the connection arrangements 19 of the embodiments as described with respect to FIGS. 5-10. The connection element 27 has a base 55 from which two bushings 57 extend away. The direction in which each bushing 57 extends from the base 55 defines the plug direction 31 along which a counter connection element 29 can be connected to the bushings 57.

The base 55, as shown in FIG. 11, has a plurality of mounting openings 59 which extend through the base 55 and which can be used for mounting the connection element 27 to an object, such as a roof or a wall of a train car. For example, a mounting element such as a screw or a bolt may be inserted through a mounting opening 59 in order to fixate the connection elements 27 to an object. In the embodiment which is shown in FIG. 11, the mounting openings 59 extend parallel with the plug direction 31 through the base 55. Consequently, if such connection element is fixated on a roof as in the embodiment of the system 47 which is described with respect to FIG. 5, the plug direction will extend vertically.

The connection element 27, as shown in FIG. 11, has an insulating casing 61 which basically surrounds a conductive element 63 inside the connection element 27. Inside the insulating casing 61, a conductive element 63 is arranged to which electrically conductive counterparts of the counter connection elements 29 can be electrically connected. The bushings 57 are adapted for electrically interconnecting counter connection elements 29 i.e. the corresponding flexible cables 25 with each other when the counter connection elements 29 are connected to the bushings 57 of the connection element 27.

Figure 12:
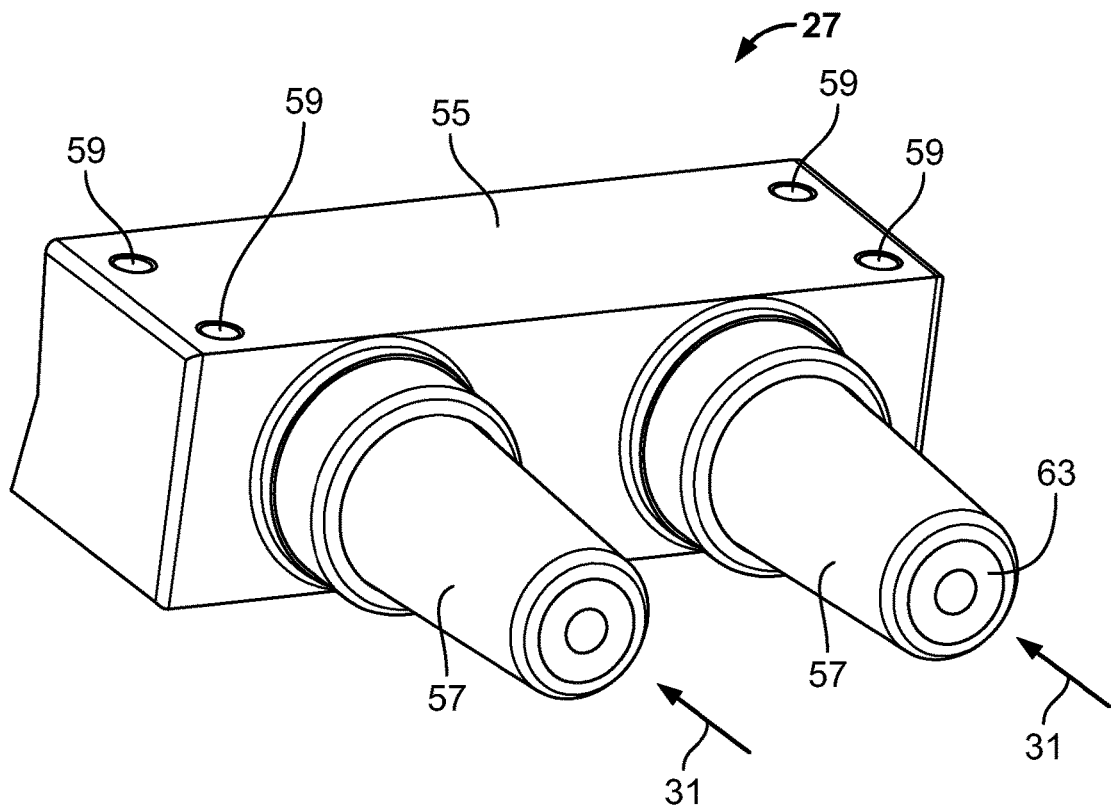
FIG. 12 is a perspective view of a connection element according to another embodiment.

In FIG. 12, another embodiment of a connection element 27 is shown which differs from the aforementioned embodiment in that the mounting openings 59 extend perpendicular to the plug direction 31 through the base 55. Such an embodiment may be used in the high voltage interconnection system 47 which is described with respect to FIG. 1. If such a connection element 27 is mounted on a roof of the train, the plug directions 31 of the bushings 57 extend basically horizontally and therefore allow a compact arrangement.

Figure 13:
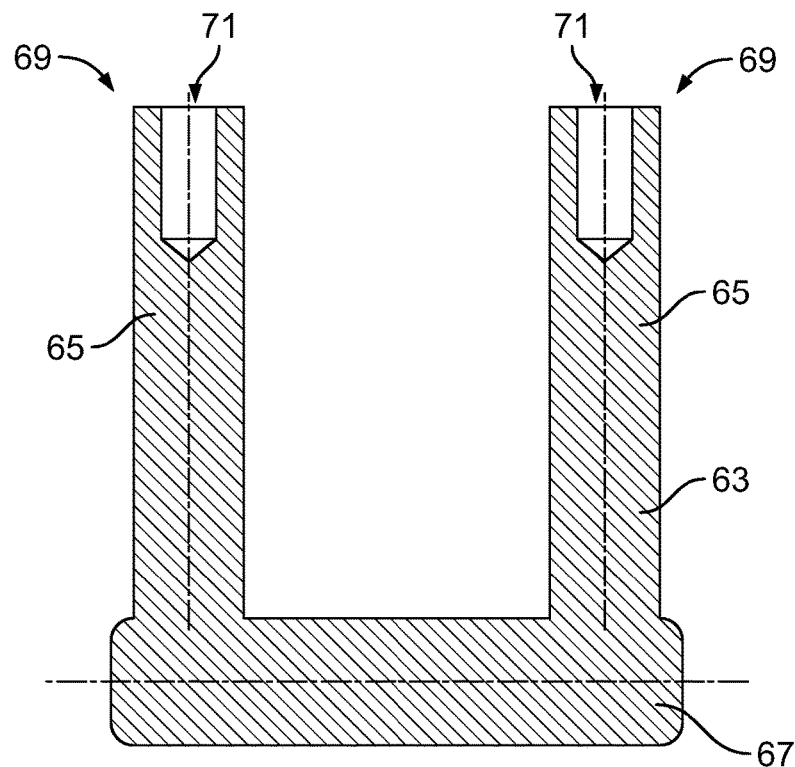
FIG. 13 is a sectional side view of a conductive element according to an embodiment.

A conductive element 63 which is used in the connection elements 27 as described with respect to FIGS. 11 and 12 is shown in FIG. 13. The conductive element 63 is made from an electrically conductive material, a material mostly containing copper in an embodiment. The conductive element 63 has an overall U-shape. Thereby, two legs 65 of the U-shape extend parallel with each other from a bottom portion 67. The bottom portion 67 extends perpendicular to longitudinal directions of the legs 65. Free ends 69 of the legs 65 have blind holes 71 which extend into the legs 65 parallel with the longitudinal directions of the legs 65. The blind holes 71 are internally threaded.

When the conductive element 63 is arranged inside the insulating casing 61, the legs 65 are part of the bushings 57 and the bottom portion 67 forms a part of the base 55 of the connection element 27. Parts of the free ends 69 may be accessible from outside the connection element 27 in order to establish an electrical connection with conductive parts of a counter connection element 29. The blind holes 71 which are internally threaded can be used for securing the position of the counter connection elements 29 with a bolt or a screw.

In the following, further embodiments of connection elements 27 are described with respect to FIGS. 14-16. Only the differences compared to the embodiments described with respect to FIGS. 11 and 12 are discussed in detail for the sake of brevity. It should further be noted that each of the connection elements 27 has a conductive element 63 having a basically similar structure as the one described with respect to FIG. 13, but differs in the directions of the legs due to the different arrangement of the bushings 57 and may also differ in the number of the legs due to a different amount of bushings 57.

Figure 14:
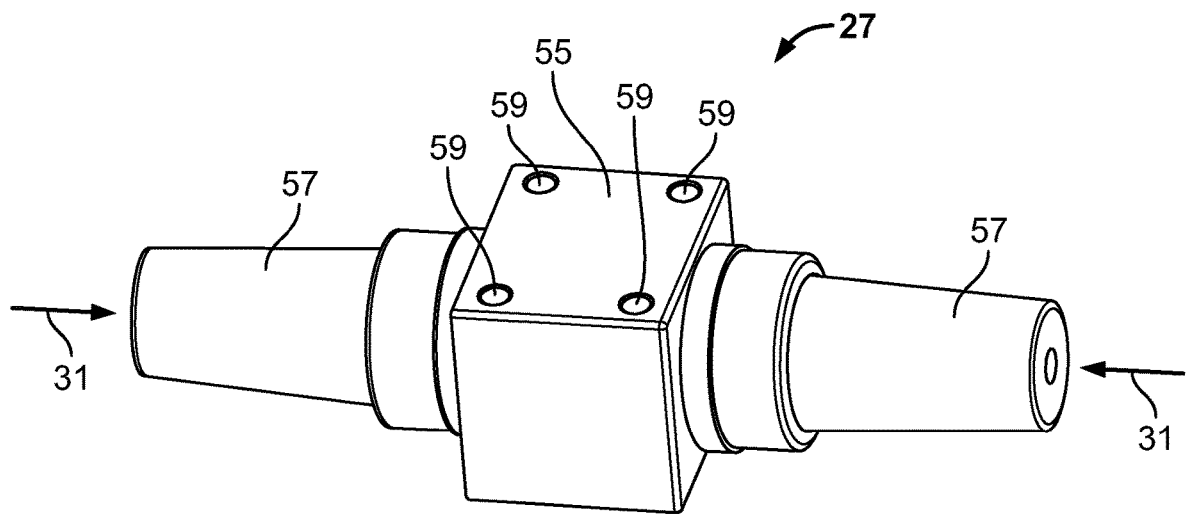
FIG. 14 is a perspective view of a connection element according to another embodiment.

In FIG. 14, a connection element 27 is shown which can be used for an in-line arrangement as for example described with respect to FIG. 2. Two bushings 57 extend away from each other in a parallel manner, but in opposite directions and in line with the oppositely orientated plug directions 31. The base 55 is arranged between both bushings 57 and is provided with mounting openings 59 extending perpendicular to the plug direction 31.

Figure 15:
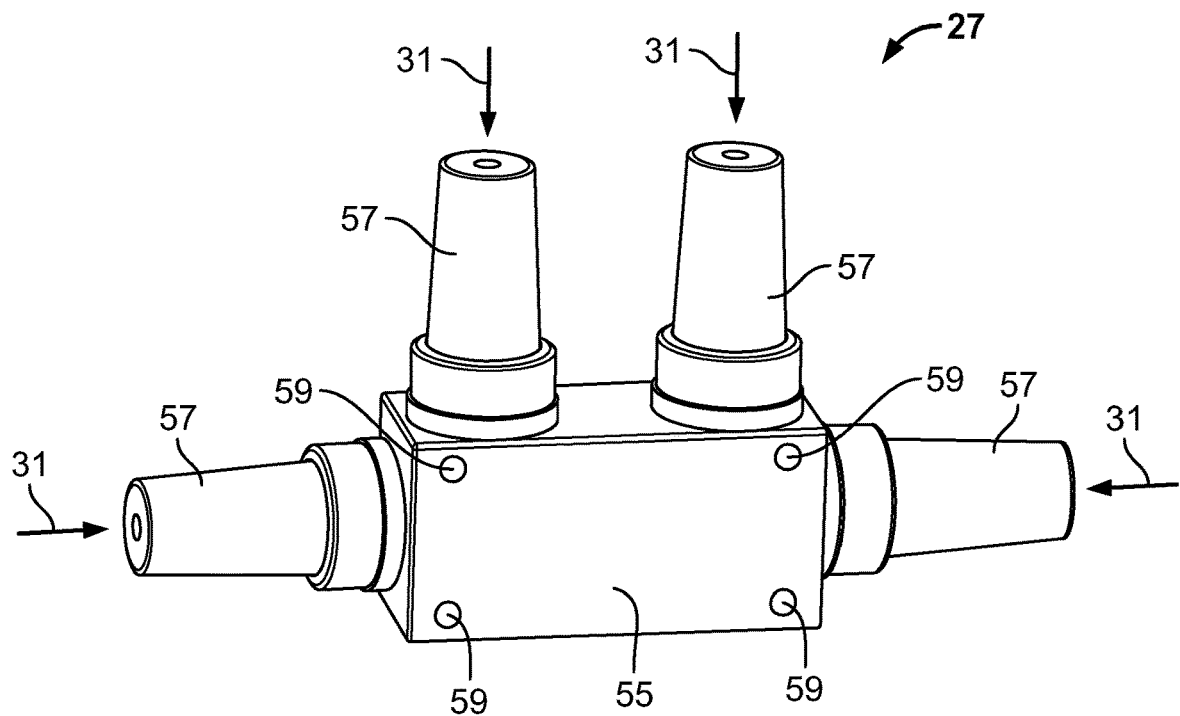
FIG. 15 is a perspective view of a connection element according to another embodiment.

The embodiment of the connection element 27 as shown in FIG. 15 can be used for connecting four counter connection elements 29. Consequently, this embodiment is provided with four bushings 57. The arrangement of the bushings 57 basically follows a combination of the embodiments as described with respect to FIG. 12 and FIG. 14. Consequently, two bushings 57 extend away from the base 55 next to each other, whereas two further bushings 57 extend perpendicular to the aforementioned bushings 57 parallel with each other but in opposite directions, thereby forming an in-line arrangement. The base 55 is provided with mounting openings 59 which extend perpendicular to the plug directions 31 of the bushings 57. Such an embodiment may be used in the system 47 as described with respect to FIG. 4.

Figure 16:
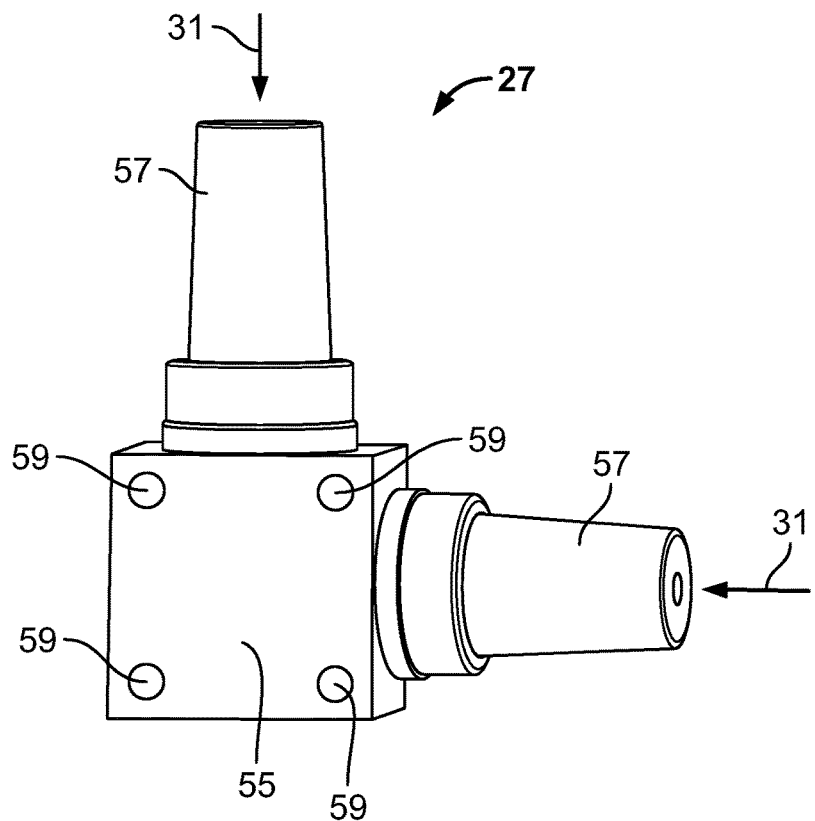
FIG. 16 is a perspective view of a connection element according to another embodiment.

The embodiment of a connection element 27 as shown in FIG. 16 is provided with two bushings 57 which are arranged perpendicular to each other in order to form a 90° arrangement. The base 55 is provided with mounting openings 59 which extend perpendicular to the plug directions 31 of the bushings 57 through the base 55. This embodiment of a connection element 27 can be used in a system 47 as described with respect to FIG. 3.

In the following, a cable holder arrangement 37 which is used in the embodiments of the assembly 5 and the high voltage interconnection system 47 as described with respect to FIGS. 1 to 8 is described with respect to FIG. 17. The cable holder arrangement 37 has a sliding collar 41 which is fixated on the flexible cable 25. The flexible cable 25 with the sliding collar 41 extends through the guiding opening 43 of a holding member 81 such that the sliding collar 41 is arranged inside the holding member 81.

Figure 17:
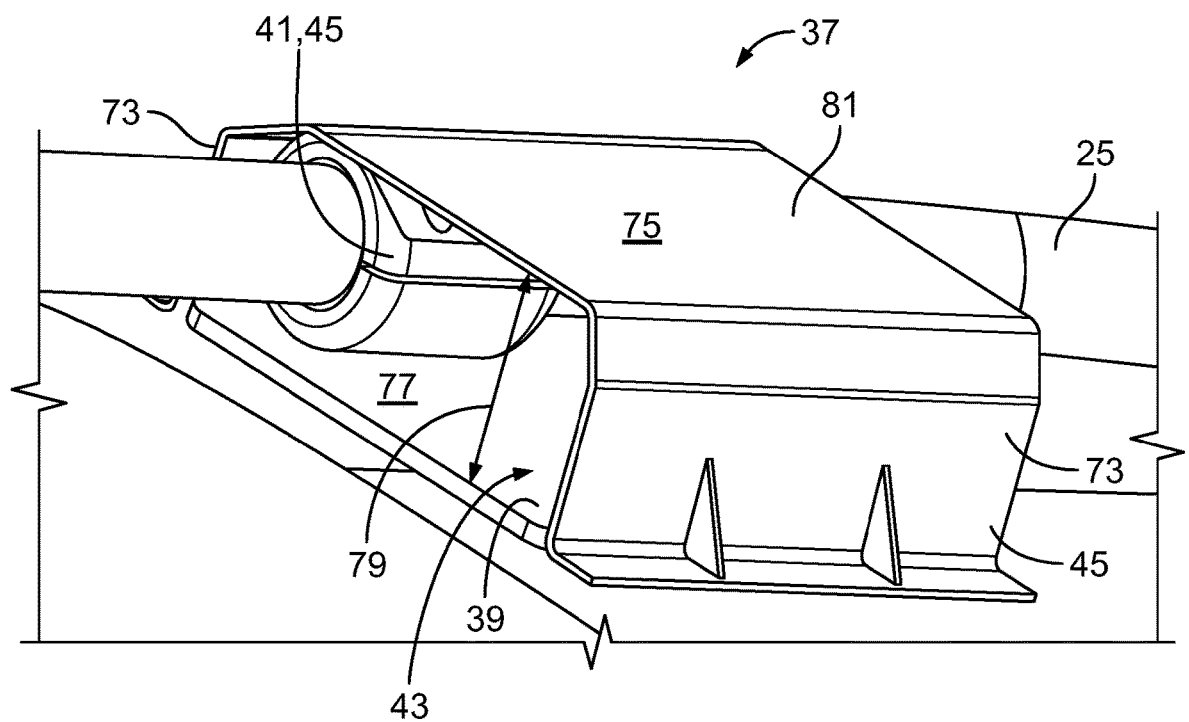
FIG. 17 is a perspective view of a cable holder arrangement according to an embodiment.

The holding member 81, as shown in FIG. 17, provides a cage- or frame-like structure which is formed by two side walls 73 which are arranged opposite to each other and a top wall 75 which interconnects the two side walls 73. The wear plate 39 forms a bottom wall 77 of the arrangement 37. The side walls 73, the wear plate 39, and the top wall 75 surround the tunnel-like guiding opening 43.

A distance 79 between the top wall 75 and the top of the wear-plate 39, in the embodiment shown in FIG. 17, is larger than a diameter of the sliding collar 41 in order to allow a movement of the flexible cable 25 with the sliding collar 41 between the walls 73 and 75 and the wear-plate 39. The cable holder arrangement 37 allows a movement of the flexible cable 25 parallel with the top wall 75 but not perpendicular to the same. Thereby, the flexible cable 25 is held in a slidable manner by the cable holder arrangement 37.

The at least one holding member 81, the at least one wear-plate 39 and/or the at least one sliding collar 41, in an embodiment, are made from a low friction plastic material, in particular a hard plastic material. Thereby, the term "hard" refers to the material being at least harder than typical rubber material. The plastic material may, in particular, be a thermoplastic material such that the elements may be formed by injection molding. Using a plastic material, in particular a hard plastic material, may increase the lifetime of the corresponding element and, at the same time, reduce friction between the elements, thereby facilitating the movement.

What is claimed is:

1. A high voltage interconnection system for electrically interconnecting a pair of objects that are movable relative to each other, comprising:
    a flexible cable;
    a connection arrangement electrically contacting an end of the flexible cable; and
    a cable holder arrangement holding the flexible cable in a slidable manner, the cable holder arrangement has a sliding collar fixed on the flexible cable and a holding member with a guiding opening, the flexible cable extends through the guiding opening and the sliding collar is arranged in the holding member.

2. The high voltage interconnection system of claim 1, wherein the pair of objects that are movable relative to each other is a pair of coupled train cars.

3. The high voltage interconnection system of claim 1, wherein the cable holder arrangement has a wear plate in slidable contact with the sliding collar.

4. The high voltage interconnection system of claim 3, wherein the wear plate and/or the sliding collar are made from a plastic material.

5. The high voltage interconnection system of claim 1, wherein the holding member is made from a plastic material.

6. The high voltage interconnection system of claim 1, further comprising a protection cover for the connection arrangement.

7. The high voltage interconnection system of claim 3, wherein the holding member provides a cage-like or frame-like structure formed by a pair of side walls arranged opposite to each other and a top wall interconnecting the side walls.

8. The high voltage interconnection system of claim 7, wherein the wear plate forms a bottom wall of the cable holder arrangement and the side walls, the wear plate, and the top wall surround the guiding opening.

9. The high voltage interconnection system of claim 8, wherein a distance between the top wall and the wear plate is larger than a diameter of the sliding collar.

10. The high voltage interconnection system of claim 7, wherein the holding member prevents movement of the sliding collar in a direction perpendicular to the top wall and at least partially allows movement of the sliding collar in a direction parallel to the top wall.

11. An assembly, comprising:
    a pair of train cars coupled to each other;
    a flexible cable extending between the train cars;
    a connection arrangement provided on at least one of the train cars and electrically contacting an end of the flexible cable, the connection arrangement has a connection element fixed to the at least one of the train cars, the flexible cable is electrically connected to the connection arrangement; and
    a cable holder arrangement on at least one of the train cars that holds the flexible cable in a slidable manner, the cable holder arrangement has a sliding collar fixed on the flexible cable and a holding member with a guiding opening, the flexible cable extends through the guiding opening and the sliding collar is arranged in the holding member.

12. The assembly of claim 11, wherein one connection arrangement is provided on each of the train cars, the connection arrangements of the train cars are interconnected by the flexible cable.

13. The assembly of claim 12, wherein the flexible cable is arranged horizontally in a region between the connection arrangements.

14. The assembly of claim 11, wherein the connection arrangement has a counter-connection element, the connection element and the counter-connection element are formed as complementary plug connectors with a horizontally aligned plug direction.

15. The assembly of claim 13, wherein the flexible cable is arranged along a curved path in the region between the connection arrangements.

16. The assembly of claim 15, wherein the curved path extends along a horizontal plane.

17. The assembly of claim 11, wherein the cable holder arrangement and the connection arrangement are offset with respect to each other along a lateral direction perpendicular to a drive direction of a train having the train cars.

18. The assembly of claim 11, wherein the connection arrangement is between the train cars.

* * * * *